Patented June 12, 1928.

1,673,093

UNITED STATES PATENT OFFICE.

LEOPOLD RUZICKA, OF GENEVA, SWITZERLAND, ASSIGNOR TO THE FIRM: M. NAEF & CO., OF GENEVA, SWITZERLAND, A SWISS COMPANY.

PROCESS FOR THE PREPARATION OF CARBOCYCLIC KETONES WITH MORE THAN NINE RING MEMBERS.

No Drawing. Application filed June 9, 1925, Serial No. 36,049, and in Switzerland June 16, 1924.

The carbon rings hitherto known have at most nine ring members. According to the generally accepted strain theory of A. von Baeyer the idea has arisen that carbon rings having a larger number of members either cannot be prepared or also must be very unstable.

It has now been discovered that the whole series of multi-membered cyclic ketones having from ten to eighteen ring members in one ring can be obtained by the usual methods for preparing ketones. From mixtures of such dicarboxylic acids as can be obtained for example in the case of certain methods of preparation, as well as from natural products, mixtures of the ketones in question are produced, which, even in this form, can be used for technical purposes. The total ketone obtained from pure dicarboxylic acids is not homogeneous but contains, besides polymethylene ketone, admixtures of other ketones. It has further been found that the proportion of pure polymethylene ketone in this total ketone is higher if the thorium or cerium salts of the dicarboxylic acids are employed for the ketone preparation. The latter salts also give in general a higher yield of total ketone than other metallic salts.

The noteworthy observation has also been made in this connection that starting from cyclodecanone the yields of monocyclic ketone from dicarboxylic acid in general increase with an increasing number of ring members. The multi-membered ketones, contrary to what might have been expected, are more stable in the presence of acid and alkaline agents and raised temperature than the five-membered and six-membered monocyclic ketones.

These new ketones have a characteristic smell, and moreover cyclo-pentadecanone and the adjacent ketones have the typical musk and civet smell and can be used in complete substitution for these natural products. It has also been found that the scent-carriers of natural musk and civet are closely related chemically to these ketones.

Example 1.

The thorium salt of tetradecane-1.14-dicarboxylic acid is heated, preferably in a vacuum, and advantageously with the addition of a good conductor of heat, such as copper or iron turnings, up to from 300 to more than 400° C., and the distillate obtained therefrom is worked up by fractional distillation.

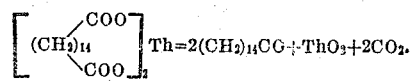

For the preparation of cyclo-pentadecanone in a pure state, the fractions having about the same boiling point as this ketone (for example those boiling at from 100 to 150° C. in a high vacuum) are treated with semi-carbazide and the resulting semicarbazone recrystallized from alcohol. By treating the purified semicarbazone with acids the cyclopentadecanone can then be regenerated. The latter melts at 63° C. and boils at 120° C. (at 0.3 mm.) while the semicarbazone melts at 187° C. In the mother liquor of this semicarbazone is contained a mixture of semicarbazones melting at a lower temperature which is not sharply defined and giving upon treatment with acids a ketone mixture. For the isolation of the ketones, instead of semicarbazide some other of the usual ketone reagents may be employed. Upon oxidation with chromic acid, tridecane-1.13-dicarboxylic acid is obtained from the cyclo-pentadecanone.

Example 2.

Tetradecane-1.14-dicarboxylic acid is gradually heated up to above 400° C. preferably in a vacuum towards the end and the distillate obtained is worked up according to the method described in Example 1.

Example 3.

Tetradecane-1.14-dicarboxylic acid is gradually heated in the presence of cerium up to above 400° C. at the close preferably in a vacuum and the resulting distillate is worked up according to the method described in Example 1.

Example 4.

Tetradecane-1.14-dicarboxylic acid is gradually heated to more than 400° C. in the presence of thorium oxide preferably in a vacuum towards the end and the resulting distillate is worked up according to the method described in Example 1. This process may also be varied by passing the vapors of the acid over the thorium oxide heated in a vacuum to 400° C.

*Example 5.*

The anhydride of tetradecane-1.14-dicarboxylic acid is gradually heated to over 400° C. preferably in a vacuum towards the end and the distillate obtained is worked up according to the method described in Example 1.

*Example 6.*

The anhydride of tetradecane-1.14-dicarboxylic acid is gradually heated to over 400° C. with thorium oxide preferably in a vacuum towards the end and the distillate obtained is worked up according to the method described in Example 1.

*Example 7.*

Tetradecane-1.14-dicarboxylic acid is heated with acetic acid anhydride and the temperature of the mixture gradually raised to over 400° C. Towards the end the reaction is preferably carried on in a vacuum. The distillate obtained is worked up according to the method described in Example 1.

*Example 8.*

The thorium salt or nonane-1.9-dicarboxylic acid is worked up to keytone by the method described in Example 1 with the difference that in this case the fraction boiling at from 80 to 120° C. (at 12 mms.) is treated with ketone reagents.

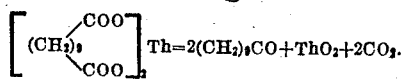

Cyclodecanone boils at 100° C. (at 12 mms.) and yields a semi-carbazone melting at 200° C. From the mother liquor of the latter a semicarbazone melting at a temperature which is lower but not clearly defined, can be obtained, which, upon treatment with acids, yields a ketone mixture. Upon oxidation with chromic acid, octane-1.8-dicarboxylic acid is produced from the cyclodecanone.

*Example 9.*

The thorium salt of decane-1.10-dicarboxylic acid is worked up according to the method described in Example 1 and in this case the fraction boiling between 90 and 130° C. (at 12 mms.) is treated with ketone reagents.

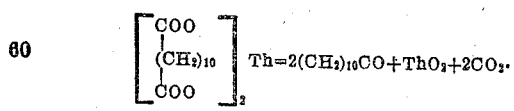

Cyclo-undecanone boils at 110° C. (at 12 mms.) and yields a semicarbazone melting at 200° C. In the mother liquor of this semicarbazone there is a mixture of semicarbazones. The cyclo-undecanone yields upon oxidation with chromic acid, nonane-1.9-dicarboxylic acid.

*Example 10.*

The thorium salt of undecane-1.11-dicarboxylic acid is worked up to ketones by the method described in Example 1 and in this case the fraction boiling between 100 and 150° C. (at 12 mms.) is treated with ketone reagents.

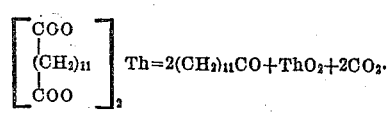

The cyclo-dodecanone obtained melts at 59° and boils at 125° C. (at 12 mms.). The semicarbazone thereof melts at 226° C. From the mother liquor of the latter is obtained a mixture of semicarbazone of lower and not clearly defined melting point from which a mixture of ketones can be obtained. Upon oxidation with chromic acid, decane-1.10-dicarboxylic acid is obtained from the cyclo-dodecanone.

*Example 11.*

The thorium salt of dodecane-1.12-dicarboxylic acid is worked up by the method described in Example 1, and in this case the fraction boiling between 110 and 160° C. (at 12 mms.) is treated with ketone reagents.

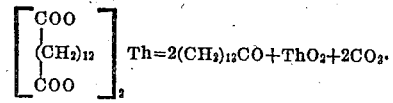

The pure cyclo-tridecanone melts at 32° C. and boils at 138° C. (at 12 mms.). Its semicarbazone has a melting point of 207° C. From the mother liquor thereof is obtained a semicarbazone mixture of lower and undefined melting point from which a mixture of ketones can be regenerated. Cyclo-tridecanone yields upon oxidation with chromic acid undecane-1.11-dicarboxylic acid.

*Example 12.*

The thorium salt of tridecane-1.13-dicarboxylic acid is worked up by the method described in Example 1 and the fraction boiling at 130 to 180° C. (at 12 mms.) is treated with ketone reagents.

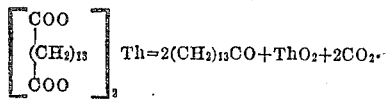

Pure cyclo-tetra-decanone melts at 52° C. and boils at 155° C. (at 12 mms.). The semicarbazone thereof melts at 197° C. From the mother liquor of the latter is obtained a semicarbazone mixture of lower and not clearly defined melting point from which a mixture of ketones can be regenerated.

From the cyclo-tetradecanone is obtained dodecane-1.12-dicarboxylic acid upon oxidation with chromic acid.

Example 13.

The thorium salt of pentadecane-1.15-dicarboxylic acid is treated by the method described in Example 1 and in this case the fraction boiling between 110 and 160° C. (at 0.3 of a mm.) is converted with ketone reagents.

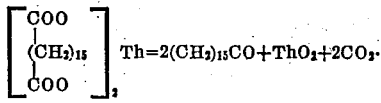

The pure cyclo-hexadecanone melts at 56° C. and boils at 138° C. (at 0.3 of a mm.). Its semicarbazone melts at 180°C. From the mother liquor of the latter is obtained a mixture of semicarbazone of lower, and not clearly defined melting point. Upon oxidation of the cyclo-hexadecanone with chromic acid tetradecane-1.14-dicarboxylic acid is obtained.

Example 14.

The thorium salt of hexadecane-1.16-dicarboxylic acid is worked up by the method described in Example 1 and in this case the fraction boiling between 120 and 170° C. (at 0.3 of a mm.) is treated with ketone reagents.

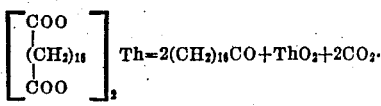

The pure cyclo-heptadecanone melts at 63° C. and boils at 145° C. (at 0.3 of a mm.). Its semicarbazone melts at 191° C. A mixture of semicarbazones of lower and not clearly marked melting point is obtained besides, from which a mixture of ketones can be regenerated. Upon oxidation of the cyclo-heptadecanone with chromic acid, pentadecane-1.15-dicarboxylic acid is obtained.

Example 15.

The thorium salt of heptadecane-1.17-dicarboxylic acid is worked up by the process described in Example 1 and in this case the fraction boiling between 130 and 180° C. (at 0.3 of a mm.) is treated with ketone reagents.

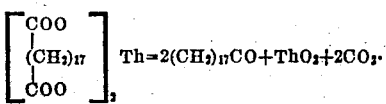

The pure cyclo-octadecanone melts at 71° and boils at 158° C. (at 0.3 of a mm.). Its semicarbazone melts at 184° C. From the mother liquor thereof is obtained a mixture of semicarbazones of lower and not clearly marked melting point from which a mixture of ketones can be regenerated. Upon oxidation of the cyclo-octadecanone with chromic acid hexadecane-1.16-dicarboxylic acid is obtained.

Example 16.

From the mixture of the thorium salts of tridecane-1.13-dicarboxylic acid, tetradecane-1.14-dicarboxylic acid and pentadecane-1.15-dicarboxylic acid is obtained by the method described in Example 1 a mixture of cyclo-tetradecanone, cyclo-pentadecanone, and cyclo-hexadecanone.

Example 17.

From a mixture of the thorium salts of tetradecane-1.14-dicarboxylic acid and hexadecane-1.16-dicarboxylic acid is obtained by the method described in Example 1 a mixture of cyclo-pentadecanone and cyclo-heptadecanone.

Example 18.

From a mixture of the cerium and thorium salts of tetradecane-1.14-dicarboxylic acid is obtained by the method described in Example 1, cyclo-pentadecanone.

I claim:

1. The process of preparing monocyclic ketones having more than nine ring members which comprises heating a normal straight chain aliphatic dicarboxylic acid salt of the fourth group of the periodic system, said acid having a carbon chain containing more than ten carbon atoms, the carboxylic acid groups being linked to the end carbons thereof.

2. The process of preparing monocyclic ketones having more than nine ring members which comprises heating a normal straight chain aliphatic dicarboxylic acid salt of one of the following metals, thorium, cerium, said acid having a carbon chain containing more than ten carbon atoms, the carboxylic acid groups being linked to the end carbons thereof.

3. The process of preparing monocylic ketones having more than nine ring members which comprises heating a normal straight chain aliphatic dicarboxylic acid salt of thorium, said acid having a carbon chain containing more than ten carbon atoms, the carboxylic acid groups being linked to the end carbons thereof.

In testimony whereof I affix my signature.

LEOPOLD RUZICKA.